United States Patent
Ahuja et al.

(10) Patent No.: US 9,686,734 B2
(45) Date of Patent: Jun. 20, 2017

(54) DETERMINING CONTENT AVAILABILITY BASED ON SELECTIVE USE OF AN ACTIVE LOCATION SYSTEM

(71) Applicant: Verizon Patent and Licensing Inc., Arlington, VA (US)

(72) Inventors: Sanjay Ahuja, Irving, TX (US); Jianxiu Hao, Acton, MA (US); Sameer Gavade, Irving, TX (US); Om Prakash Jilla, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 20 days.

(21) Appl. No.: 14/710,966

(22) Filed: May 13, 2015

(65) Prior Publication Data
US 2016/0337940 A1 Nov. 17, 2016

(51) Int. Cl.
*H04W 48/04* (2009.01)
*H04W 4/02* (2009.01)

(52) U.S. Cl.
CPC ........... *H04W 48/04* (2013.01); *H04W 4/021* (2013.01); *H04W 4/023* (2013.01)

(58) Field of Classification Search
None
See application file for complete search history.

(56) References Cited

U.S. PATENT DOCUMENTS

| 8,781,502 | B1* | 7/2014 | Middleton | G06Q 30/0261 455/456.3 |
|---|---|---|---|---|
| 2008/0062940 | A1* | 3/2008 | Othmer | H04W 4/02 370/338 |
| 2014/0187256 | A1* | 7/2014 | Modali | H04W 4/027 455/456.1 |
| 2014/0274225 | A1* | 9/2014 | Lacatus | H04W 24/08 455/574 |
| 2015/0087303 | A1* | 3/2015 | Hillary | H04W 4/021 455/435.1 |

OTHER PUBLICATIONS

Wikipedia, "Geo-fence," http://en.wikipedia.org/wiki/Geo-fence, Apr. 6, 2015, 3 pages.

* cited by examiner

*Primary Examiner* — Daniel Lai

(57) ABSTRACT

A method may include receiving a request for content. The content may be associated with a content availability area. User devices located inside of the content availability area may be permitted access to the content. The method may include determining a first area entirely encompassed by the content availability area and/or a second area entirely encompassing the content availability area. The method may include obtaining first location information that identifies a location of a user device. The method may include selectively obtaining second location information based on whether the user device is located inside of the first area, outside of the second area, or outside of the first area and inside of the second area. The second location information may be more precise than the first location information, and may be used to determine whether the user device is located within the content availability area.

20 Claims, 12 Drawing Sheets

DETERMINING CONTENT AVAILABILITY BASED ON SELECTIVE USE OF AN ACTIVE LOCATION SYSTEM

BACKGROUND

A content provider may permit or deny access to content by a user device based on a location of the user device. The user device may determine the location of the user device using an active location system, such as a global positioning system (GPS) unit of the user device, or using a passive location system. The passive location system may determine the location of the user device based on interactions of the user device with one or more base stations, with a wireless access point (e.g., a WiFi router, etc.), with another user device, or the like.

DETAILED DESCRIPTION OF PREFERRED EMBODIMENTS

The following detailed description of example implementations refers to the accompanying drawings. The same reference numbers in different drawings may identify the same or similar elements.

A content provider may provide content to user devices. The content provider may permit access to the content by user devices that are located inside of a content availability area, and may deny access to the content by user devices that are located outside of the content availability area. Boundaries of the content availability area may include an irregular shape. For example, the boundaries of the content availability area may be based on boundaries of a town, a county, particular roads, or the like. A user device that attempts to access the content may need to determine whether the user device is located inside of the content availability area in order to permit or deny access to content by the user device.

The user device may use an active location system, such as a global positioning system (GPS) component of the user device, to determine whether the user device is located inside of the content availability area. However, the active location system may consume processor power and/or battery power of the user device. Additionally, or alternatively, the user device may use a passive location system, such as a system that determines a location based on communication by the user device with one or more base stations, with one or more wireless access points, with one or more other user devices, or the like, to determine a location of the user device. The passive location system may provide less precise location information than the active location system, but may use less battery power of the user device.

Implementations described herein may enable a user device to determine whether the user device is located inside of the content availability area using an active location system and/or a passive location system as needed. In this way, the user device may conserve processors power and/or battery power by using the passive location system when a precise location of the user device is not needed, and may use the active location system when a precise location of the user device is needed.

Figure 1A:
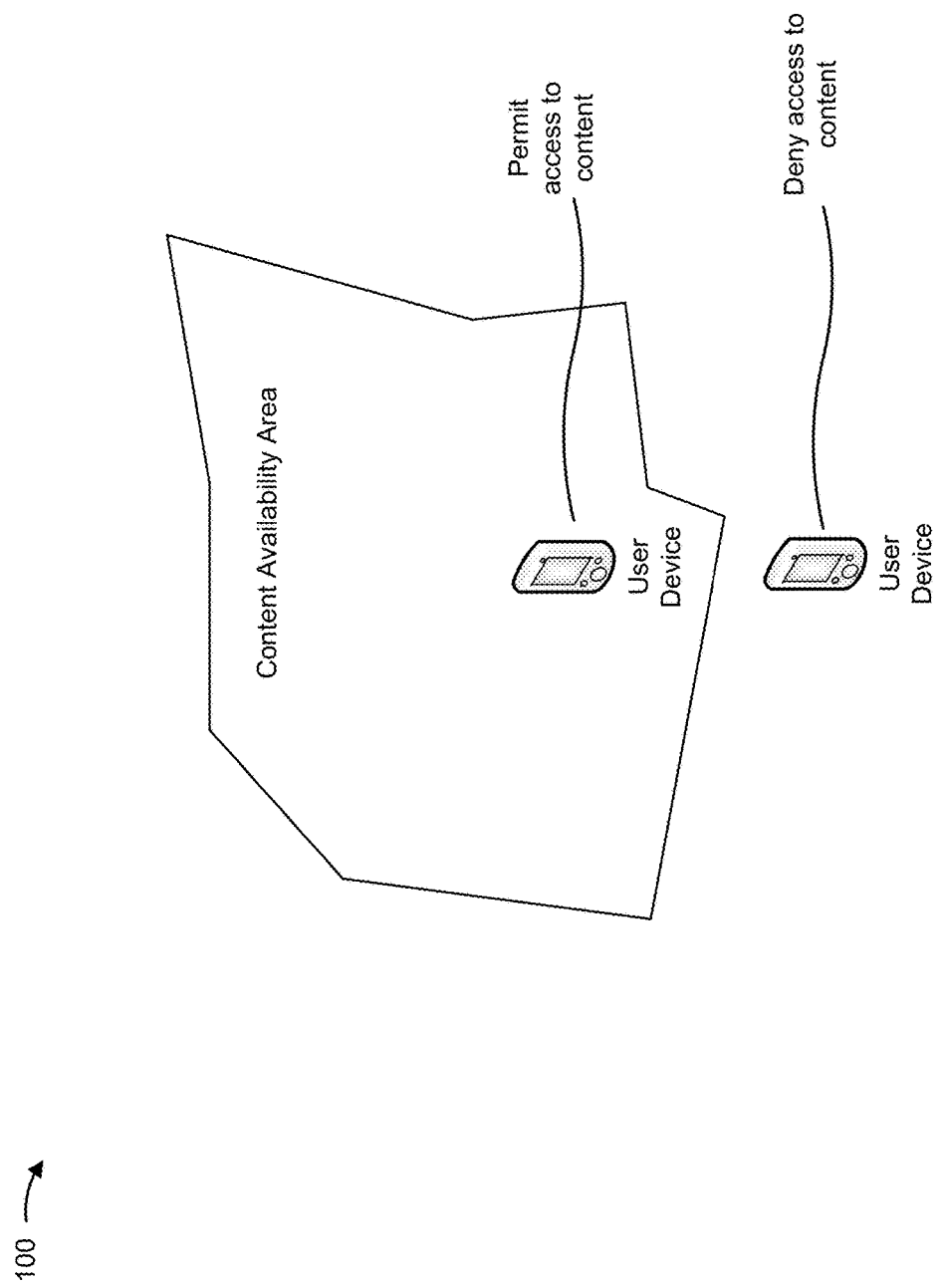
FIGS. 1A and 1B are diagrams of an overview of an example implementation described herein.
Figure 1B:
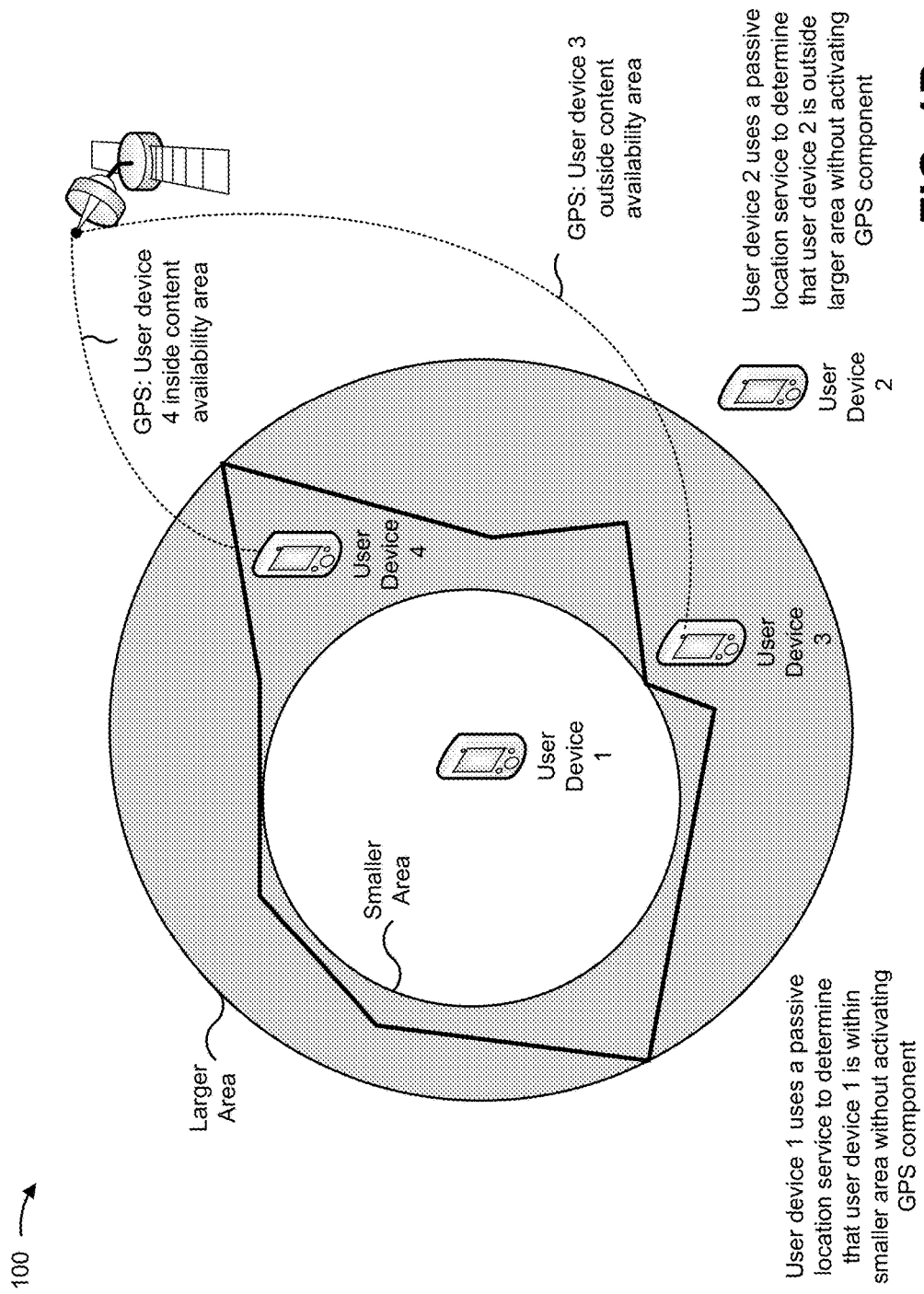

FIGS. 1A and 1B are diagrams of an overview of an example implementation 100 described herein. For the purpose of FIGS. 1A and 1B, assume that a content provider defines a content availability area for controlling access to content. Assume that user devices shown in FIGS. 1A and 1B include an active location system (e.g., that determines a location using a global positioning system (GPS) component of the user devices) and a passive location system (e.g., that determines a location based on communications by the user devices with one or more other devices). The active location system is capable of determining a more precise location of the user devices (e.g., more precise than a location determined by the passive location system).

As shown in FIG. 1A, boundaries of a content availability area may include an irregular shape. As further shown, user devices located inside of the content availability area may permit access to content by the user devices. As shown, user devices outside of the content availability area may deny access to content by the user devices.

For the purpose of FIG. 1B, assume that a device (e.g., a server device, etc.) defines a smaller area and a larger area based on the content availability area, where the smaller area is smaller relative to the larger area. Assume, for this example, that the smaller area and the larger area are circular in shape. As shown, the smaller area is entirely included in (e.g., inscribed in) the boundaries of the content availability area. As further shown, the larger area entirely includes (e.g., circumscribes) the boundaries of the content availability area and, thus, also includes the smaller area.

Consider four user devices as shown: user device 1, user device 2, user device 3, and user device 4. As shown, user device 1 is located inside of the smaller area. As further shown, user device 2 is located outside of the larger area. As shown, user device 3 is located inside of the larger area and outside of the content availability area. As further shown, user device 4 is located outside of the smaller area and inside of the content availability area and the larger area.

A user device of FIG. 1B may determine whether to permit access to content based on whether the user device is located inside of the content availability area. In situations when the user device is located inside of the smaller area or outside of the larger area, the passive location system may provide location information of a precision sufficient to determine whether the user device is located inside of the content availability area without consuming an amount of processor power and/or battery power of the user device that would be used if the user device used the active location system. For example, the passive location system may be capable of determining whether the user device is within a particular radius of a center point of the smaller area and/or the larger area.

As shown, user device 1, located inside of the smaller area, uses the passive location system to determine that user device 1 is located inside of the content availability area, based on the passive location system indicating that user device 1 is located inside of the smaller area. Because user device 1 is located within the smaller area and, thus, within the content availability area, user device 1 permits access to the content. As further shown, user device 2 uses the passive location system to determine that user device 2 is located outside of the content availability area, based on the passive location system indicating that user device 2 is located outside of the larger area. Because user device 2 is located outside of the larger area and, thus, outside of the content availability area, user device 2 denies access to the content. In this way, a user device that is located inside of the smaller area or outside of the larger area may determine whether the user device is located inside the content availability area using the passive location system, without activating the active location system, thus conserving battery power of the user device.

In some situations, location information obtained from the passive location system is insufficiently precise to determine whether a user device is located inside of the content availability area. For example, as shown, the content availability area may be irregularly shaped, and a user device may be located outside of the smaller area and inside of the larger area. In such situations, the user device may determine that the user device is located outside of the smaller area and inside of the larger area using the passive location system. Based on being located outside of the smaller area and inside of the larger area, the user device may obtain location information from a more precise location system, such as the active location system, to determine whether the user device is located inside of the content availability area. The active location system may consume more battery power than the passive location system, and may provide location information that is sufficiently precise to determine whether the user device is located inside of the irregularly shaped boundaries of the content availability area.

Here, assume that user devices 3 and 4 determine that user devices 3 and 4 are located outside of the smaller area and inside of the larger area using the passive location system. As a result, user devices 3 and 4 may activate the active location system (e.g., a GPS component of user devices 3 and 4) based on being located outside of the smaller area and inside of the larger area. As shown, user device 3 may determine that user device 3 is located outside of the content availability area using location information from the active location system. Because user device 3 is located outside of the content availability area, user device 3 denies access to the content. As further shown, user device 4 may determine that user device 4 is located inside of the content availability area using location information from the active location system. Because user device 4 is located inside of the content availability area, user device 4 permits access to the content.

In this way, a user device may use a passive location system to determine that the user device is located inside of a smaller area that is included in an irregularly shaped content availability area, or that the user device is located outside of a larger area that includes the content availability area. In such cases, the user device may conserve battery power by determining that the user device is located inside of or outside of the content availability area without activating an active location system. In situations where the passive location system is insufficiently precise to determine if the user device is located inside of the content availability area, the user device may activate an active location system, which may consume additional processor power and/or battery power, and which may provide location information of a precision sufficient to determine whether the user device is located inside of the content availability area.

Figure 2:
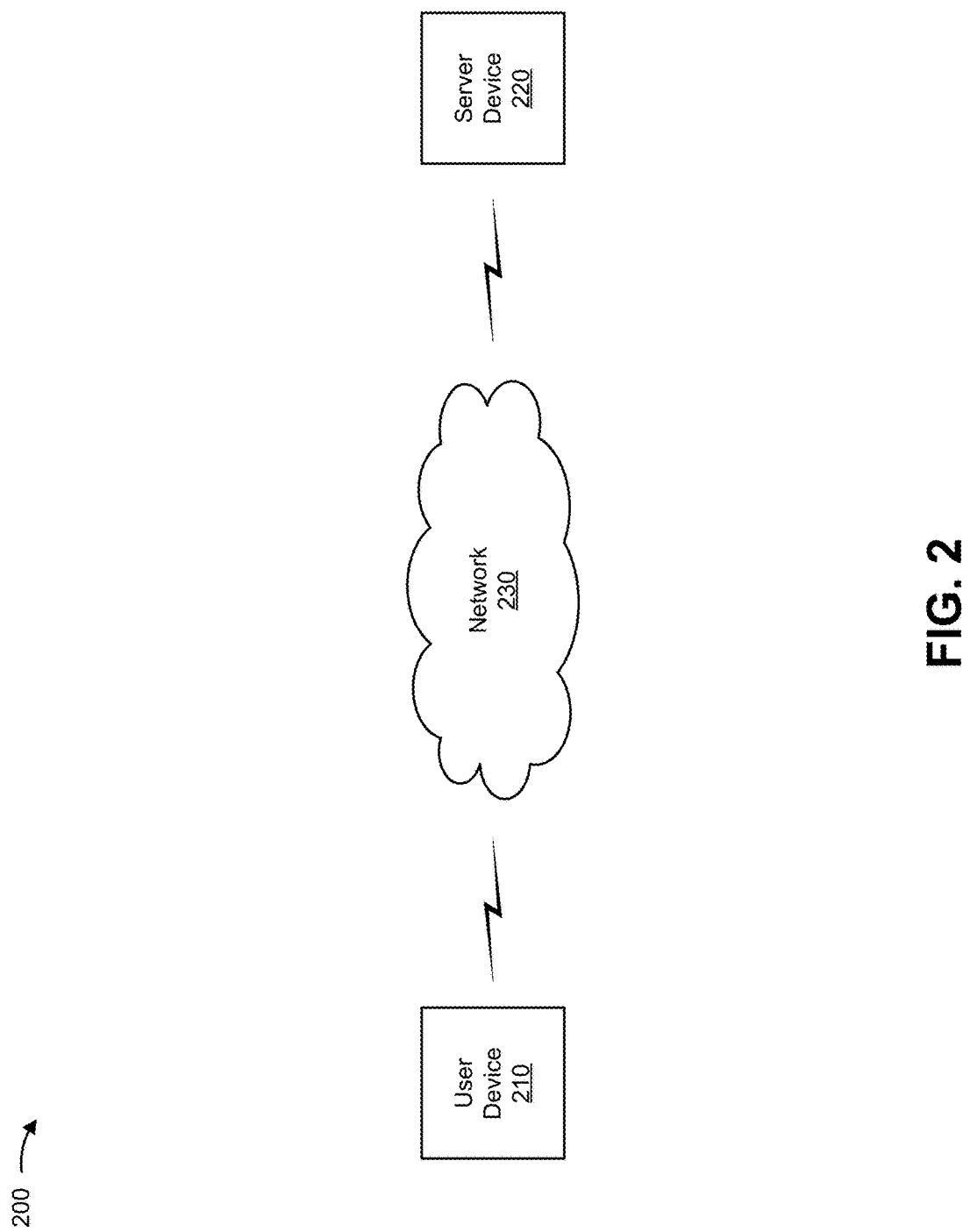
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and/or computing device, such as a mobile phone (e.g., a smart phone, etc.), a tablet computer, a handheld computer, a wearable communication device (e.g., a smart wristwatch, a pair of smart eyeglasses, etc.), or a similar type of device. User device 210 may attempt to access content. User device 210 and/or another device (e.g., server device 220, etc.) may permit or deny access to the content based on a location of user device 210 relative to a content availability area.

In some implementations, user device 210 may include and/or obtain location information from a passive location system. The passive location system may include hardware and/or software that communicates with one or more other devices (e.g., base station(s), wireless access point(s), other user device(s), etc.) to estimate a location of user device 210 at a first level of specificity. The passive location system may provide location information that is less precise than location information provided by an active location system. Additionally, or alternatively, the passive location system may consume less processor power and/or battery power than the active location system. User device 210 may use the passive location system to determine whether user device 210 is located inside of a regularly shaped area, such as a circularly-shaped area, a triangularly-shaped area, a square-shaped area, an oval-shaped area, or the like.

Additionally, or alternatively, user device 210 may include an active location system, such as a global positioning system (GPS) component, or the like. The active location system may communicate with one or more devices (e.g., one or more GPS satellites, etc.) to determine a location of user device 210 at a second level of specificity. The second level of specificity may be more precise than the first level of specificity. For example, the active location system may identify a location of user device 210 within a range of one yard, five yards, ten yards, etc., while the passive location system may identify a location of user device 210 within a range of fifty yards, one hundred yards, five hundred yards, etc. The active location system may provide location information that enables user device 210 to determine whether user device 210 is located inside of an irregularly shaped area, such as a content availability area, and may consume more battery power than the passive location system.

Server device 220 may include one or more devices capable of storing, processing, and/or providing information. For example, server device 220 may include a server device or a collection of server devices. Server device 220 may provide content to user device 210, and/or may permit or deny access to the content by user device 210 based on a location of user device 210 relative to boundaries of a content availability area. In some implementations, server device 220 may obtain and/or store boundary information identifying boundaries of a content availability area. In some implementations, server device 220 may determine a smaller area and/or a larger area based on boundaries of a content availability area. Additionally, or alternatively, server device 220 may provide boundary information identifying the boundaries of the content availability area to user device 210 or another device. In some implementations, server device 220 may obtain location information from another device or system (e.g., user device 210, a passive location system, an active location system, etc.), and may selectively permit or deny access to content based on the location information.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented located inside of a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
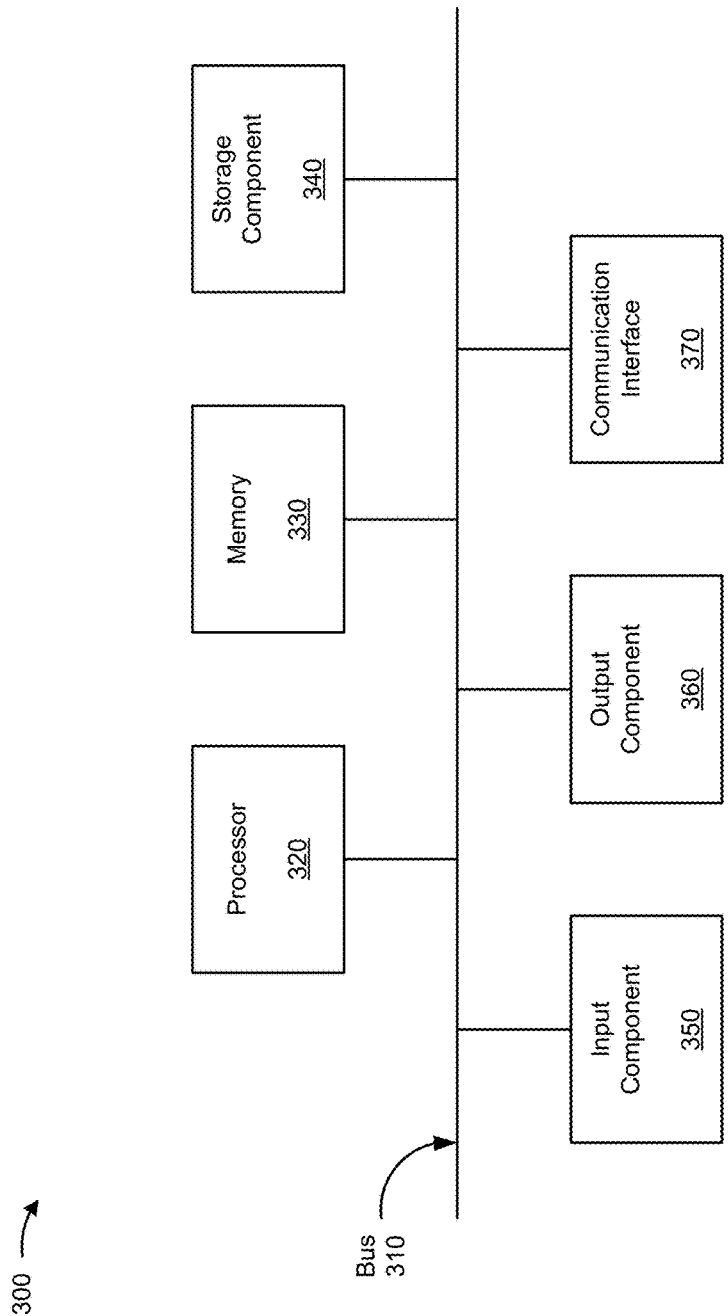
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space located inside of a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
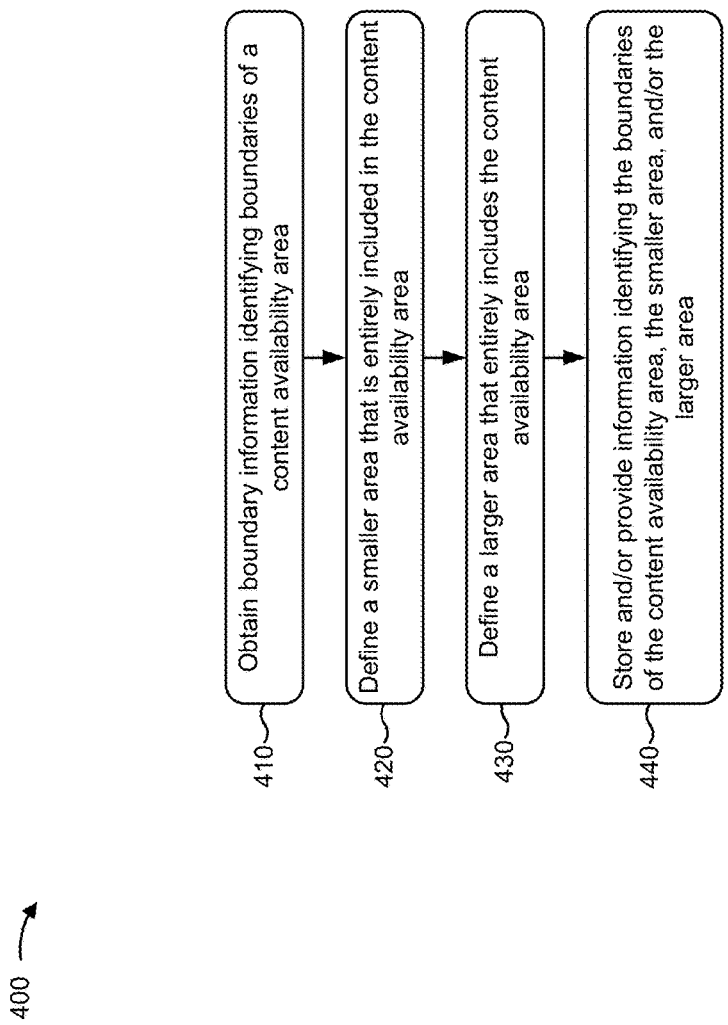
FIG. 4 is a flow chart of an example process for determining a smaller area and a larger area based on boundaries of a content availability area.

FIG. 4 is a flow chart of an example process 400 for determining a smaller area and a larger area based on boundaries of a content availability area. In some implementations, one or more process blocks of FIG. 4 may be performed by user device 210. In some implementations, one or more process blocks of FIG. 4 may be performed by another device or a set of devices separate from or including user device 210, such as server device 220.

As shown in FIG. 4, process 400 may include obtaining boundary information identifying boundaries of a content availability area (block 410). For example, a content provider may provide content (e.g., video content, audio content, multimedia content, advertising content, webpage content, etc.) to user device 210. The content provider may permit access to the content if user device 210 is located inside of a content availability area, and may deny access to the content if user device 210 is located outside of the content availability area. In some implementations, user device 210 may receive the content regardless of whether user device 210 is located inside of the content availability area. In this case, user device 210 may include software that prevents user device 210 form storing, accessing, etc. the content while user device 210 is located outside of the content availability area.

The content availability area may be a geographical area that is defined by boundaries. User device 210 may obtain (e.g., receive) boundary information identifying the boundaries of the content availability area. Based on the boundary information, user device 210 may determine a larger area and a smaller area. User devices 210, which are located inside of the smaller area or outside of the larger area, may be capable of determining that user devices 210 are located inside of, or outside of, the content availability area based on less precise location information, without activating an active location system of the user devices 210.

A content provider may deny access to content by user devices 210 located outside of a content availability area. For example, the content may include a regional television station, a sporting event, a regional emergency notification, a discount on goods related to the content availability area, or the like. The content availability area may be bounded by boundaries that are irregularly shaped, in some cases. For example, the boundaries of the content availability area may be determined based on a border (e.g., a border of a city, a county, a state, a nation, a river, a road, etc.), based on a coverage area of a regional television station, based on a service area of a particular network provider, or the like. User device 210 may obtain the boundary information from server device 220. For example, server device 220 may store a set of coordinates that define the boundaries of the content availability area, and/or may provide the set of coordinates to user device 210.

As further shown in FIG. 4, process 400 may include determining a smaller area that is entirely included in the content availability area (block 420). For example, based on the boundary information, user device 210 or another device (e.g., server device 220) may define a smaller area. The smaller area may be entirely included in the content availability area. For example, the smaller area may be inscribed in the boundaries of the content availability area. In some implementations, the smaller area may be a regularly shaped area, such as a circle. By defining the smaller area to be entirely included in the content availability area, user device 210 and/or server device 220 may ensure that user devices 210 located inside of the smaller area are also located inside of the content availability area. User device 210 and/or server device 220 may use location information (e.g., location information obtained from a passive location system) that is less precise than more precise location information from an active location system, to determine whether user device 210 is located within the smaller area. Based on whether user device 210 is within the smaller area, user device 210 and/or server device 220 may selectively obtain more precise location information, permit access to content, or the like.

In some implementations, user device 210 may define the smaller area. For example, user device 210 may obtain boundary information from server device 220, and may define the smaller area based on the boundary information. Additionally, or alternatively, server device 220 may define the smaller area based on the boundary information, and/or may provide information describing the smaller area to user device 210, which may conserve resources of user device 210.

In some implementations, user device 210 may define a circular smaller area. For example, user device 210 may define a center point of the smaller area, and a radius to a boundary of the smaller area. A circular smaller area may permit user device 210 to determine whether user device 210 is located inside of the circular smaller area using a passive location system. For example, the passive location system may lack precision sufficient to determine whether user device 210 is located inside of an irregularly shaped area (e.g., a content availability area), but may be capable of determining whether user device 210 is located within a particular radius of a point (e.g., a point at a center of a circular smaller area of the particular radius). In this way, user device 210 may conserve battery power by determining whether user device 210 is within the smaller area without activating an active location system.

As further shown in FIG. 4, process 400 may include determining a larger area that entirely includes the content availability area (block 430). For example, based on the boundary information, user device 210 or another device (e.g., server device 220) may define a larger area. The larger area may entirely include the content availability area, in some implementations. For example, the larger area may circumscribe the content availability area. In some implementations, the larger area may be concentric with the smaller area (e.g., the larger area may share a particular center point with the smaller area). User device 210 and/or server device 220 may determine whether to obtain location information from the active location system based on whether user device 210 is located inside of the larger area (e.g., based on less precise location information from the passive location system). By defining the larger area to entirely include the content availability area, user device 210 and/or server device 220 may determine that user devices 210, located outside of the larger area, are located outside of the content availability area, without consuming additional battery power to obtain more precise location information from an active location system.

In some implementations, user device 210 may define the larger area. For example, user device 210 may obtain boundary information from server device 220, and may determine the smaller area based on the boundary information. Additionally, or alternatively, server device 220 may define the larger area based on the boundary information, and may provide information describing the larger area to user device 210, which may conserve resources of user device 210.

In some implementations, user device 210 may define a circular larger area. For example, user device 210 may define a center point of the larger area, and a radius to a boundary of the larger area. A circular larger area may permit user device 210 to determine whether user device 210 is located inside of the circular larger area using a passive location system. For example, the passive location system may lack precision sufficient to determine whether user device 210 is located inside of an irregularly shaped area (e.g., a content availability area), but may be capable of determining whether user device 210 is located within a particular radius of a point (e.g., a point at a center of a circular larger area of the particular radius). In this way, user device 210 may conserve battery power by determining whether user device 210 is within the larger area without activating an active location system.

As further shown in FIG. 4, process 400 may include storing and/or providing information identifying the boundaries of the content availability area, the smaller area, and/or the larger area (block 440). For example, user device 210 may store information identifying the boundaries of the content availability area, the smaller area, and/or the larger area. In some implementations, user device 210 may store a center point of a circular smaller area and/or a circular larger area, and a radius of the circular smaller area and/or the circular larger area. In some implementations, server device 220 may determine the smaller area and/or the larger area, and may provide information describing the smaller area and/or the larger area to user device 210. Additionally, or alternatively, server device 220 may store information identifying the boundaries of the content availability area, the smaller area, and/or the larger area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
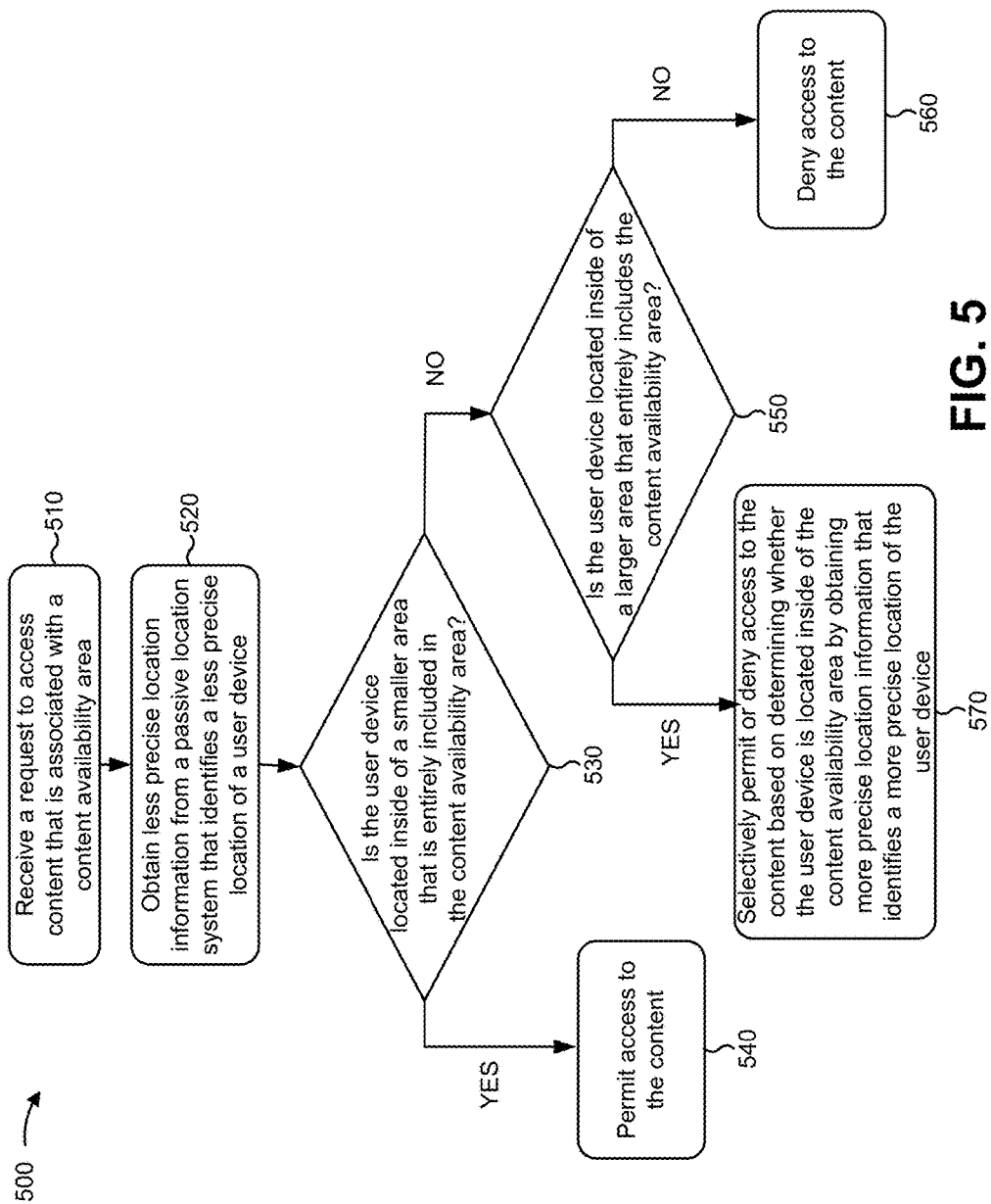
FIG. 5 is a flow chart of an example process for permitting or denying access to content based on location information.

FIG. 5 is a flow chart of an example process 500 for permitting or denying access to content based on location information. In some implementations, one or more process blocks of FIG. 5 may be performed by user device 210. In some implementations, one or more process blocks of FIG. 5 may be performed by another device or a set of devices separate from or including user device 210, such as server device 220.

As shown in FIG. 5, process 500 may include receiving a request to access content that is associated with a content availability area (block 510). For example, user device 210 may receive a request to access content that is associated with a content availability area. In some implementations, user device 210 may receive the request from a user of user device 210. In some implementations, server device 220 may receive a request to access content from user device 210 (e.g., based on a user of user device 210 attempting to access the content). As described below, user device 210 and/or server device 220 may determine whether user device 210 is located inside of the content availability area based on a passive location system and/or an active location system of user device 210.

As further shown in FIG. 5, process 500 may include obtaining location information from a passive location system that estimates a location of a user device (block 520). For example, user device 210 and/or server device 220 may obtain less precise location information from a passive location system (e.g., less precise than location information obtained from an active location system). In some implementations, the passive location system may be hosted by user device 210. Additionally, or alternatively, the passive location system may be hosted by another device, such as server device 220, a network device associated with a cellular network, or the like.

A passive location system may determine location information that describes a location of user device 210 based on communications with one or more base stations, one or more wireless access points, one or more other user devices 210, or the like, based on previously determined location information, or based on other information. For example, user device 210 may communicate with one or more base stations, and the passive location system may determine a location of user device 210 based on the communication (e.g., based on triangulation, trilateration, multi-lateration, etc.). Additionally, or alternatively, user device 210 may communicate with a wireless access point, and the passive location system may determine a location of user device 210 based on a location associated with the wireless access point. Additionally, or alternatively, user device 210 may communicate with one or more other user devices 210 (e.g., using near field communication (NFC), Bluetooth, etc.), and the passive location system may determine a location of user device 210 based on locations of the one or more other user devices 210 (e.g., based on triangulation, trilateration, multi-lateration, etc.). Additionally, or alternatively, user device 210 provide previously determined location information, and the passive location system may estimate a location of user device 210 based on the previously determined location information.

In some implementations, a passive location system may use fewer resources than an active location system. For example, the passive location system may be implemented on a device other than user device 210, may not cause user device 210 to transmit signals, may use less processing power, may not cause user device 210 to activate a specialized location determination component, or the like. A passive location system may determine location information that is less precise than location information determined by an active location system, in some implementations. For example, a passive location system may be capable of determining whether user device 210 is located within a particular radius of a point, but not whether user device 210 is located inside of an irregularly shaped area (e.g., a content availability area). In cases where the passive location system is insufficiently precise to determine whether user device 210 is located inside of the irregularly shaped area, user device 210 may obtain more precise location information from an active location system (e.g., a GPS component of user device 210) to determine whether user device 210 is located inside of the irregularly shaped area.

In some implementations, a passive location system may be implemented on user device 210. For example, user device 210 may determine a location of user device 210 using a passive location system, and may store and/or provide location information that identifies the location. Additionally, or alternatively, a passive location system may be implemented on another device. For example, server device 220 may determine a location of user device 210 using a passive location system, and may store and/or provide location information (e.g., to user device 210). By obtaining the location information, server device 220 may improve security of the content (e.g., by preventing spoofing of the location information by user device 210, etc.).

As further shown in FIG. 5, process 500 may include determining whether the user device is located inside of a smaller area that is entirely included in the content availability area (block 530). For example, user device 210 and/or server device 220 may obtain less precise location information from a passive location system to determine whether user device 210 is located inside of a smaller area. The smaller area may be a circular area that is entirely included in the content availability area. The less precise location information may indicate whether user device 210 is located inside of the smaller area. For example, the less precise location information may indicate that user device 210 is within a particular distance of a center point of the smaller area.

As further shown in FIG. 5, if the user device is located inside of the smaller area (block 530—YES), process 500 may include permitting access to the content (block 540). For example, any location that is inside of the smaller area is necessarily located inside of the content availability area, based on the smaller area being entirely included in the content availability area. If the less precise location information obtained from the passive location system indicates that user device 210 is located inside of the smaller area, user device 210 may be permitted access to the content. In this way, user device 210 may determine whether to permit or deny access to the content based on the passive location system, which may conserve battery power and/or processor power of user device 210.

As further shown in FIG. 5, if the user device is not located inside of the smaller area (block 530—NO), process 500 may include determining whether the user device is located inside of a larger area that entirely includes the content availability area (block 550). For example, based on the less precise location information, user device 210 and/or server device 220 may determine that user device 210 is not located inside of the smaller area. In such cases, user device 210 and/or server device 220 may determine whether user device 210 is located inside of the larger area based on the less precise location information obtained from the passive location system.

As further shown in FIG. 5, if the user device is not located inside of the larger area (block 550—NO), process 500 may include denying access to the content (block 560). For example, if user device 210 and/or server device 220 determine that user device 210 is not located inside of the larger area, user device 210 may be denied access to the content. User device 210 may determine that user device 210 is not located inside of the larger area based on the less precise location information. For example, user device 210 may determine that user device 210 is not within a particular radius of a center point of the larger area. In this way, user device 210 may conserve battery power and/or processing power by determining to deny access to content without consuming battery power to activate an active location system.

As further shown in FIG. 5, if the user device is located inside of the larger area (block 550—YES), process 500 may include selectively permitting or denying access to the content based on determining whether the user device is located inside of the content availability area by obtaining more precise location information that identifies a more precise location of the user device (block 570). For example, the less precise location information may indicate that user device 210 is located inside of the larger area and outside of the smaller area. In such cases, user device 210 and/or server device 220 may obtain location information from an active location system (e.g., a GPS component of user device 210, etc.) to determine whether user device 210 is located inside of a content availability area. The active location system may consume additional battery power and/or processor power, and may provide more precise location information than a passive location system. The more precise location information may enable user device 210 and/or server device 220 to determine whether user device 210 is located inside of the content availability area in situations when the less precise location information is insufficiently precise.

In some implementations, user device 210 may permit or deny access, by user device 210, to content based on more precise location information obtained from the active location system, which may reduce processor power requirements of server device 220. In some implementations, user device 210 may provide the more precise location information from the active location system to server device 220. In such implementations, server device 220 may permit or deny access by user device 210 to the content based on the more precise location information, which may improve security of the content by preventing a user from circumventing security measures of user device 210 to access the content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6F are diagrams of an example implementation 600 relating to example processes 400 and 500 shown in FIGS. 4 and 5. FIGS. 6A-6F show an example of permitting or denying access to content based on location information. For the purpose of FIGS. 6A-6F, assume that user devices 210-1 to 210-4 include an active location system provided by a GPS component of user devices 210-1 to 210-4.

Figure 6A:
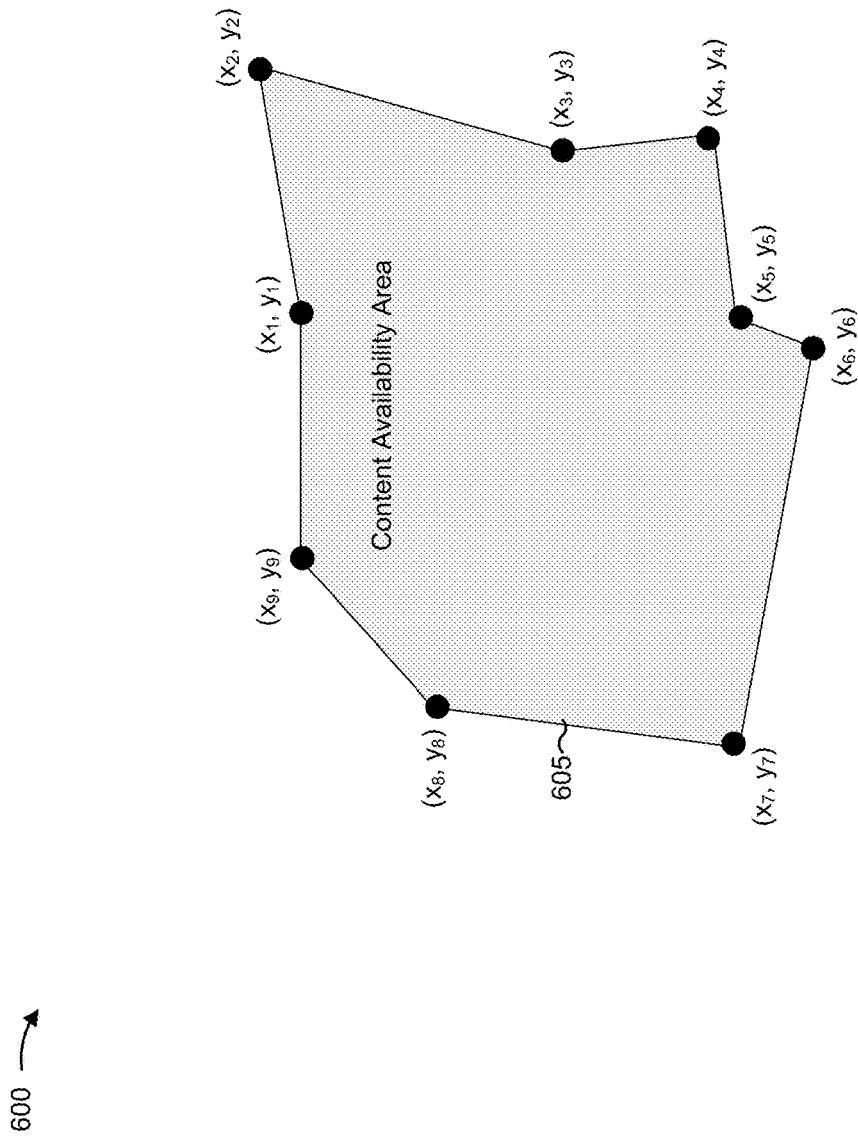
FIGS. 6A-6F are diagrams of an example implementation relating to the example processes shown in FIGS. 4 and 5.

As shown in FIG. 6A, and by reference number 605, a content availability area may be bounded by boundaries that are defined by boundary information (e.g., a set of coordinates). Here, the boundary information includes nine pairs of coordinates that identify (e.g., $(x_1, y_1)$, $(x_2, y_2)$, and so on). As shown, the boundaries of the content availability area may be irregularly shaped. Assume that server device 220 stores the boundary information.

Figure 6B:
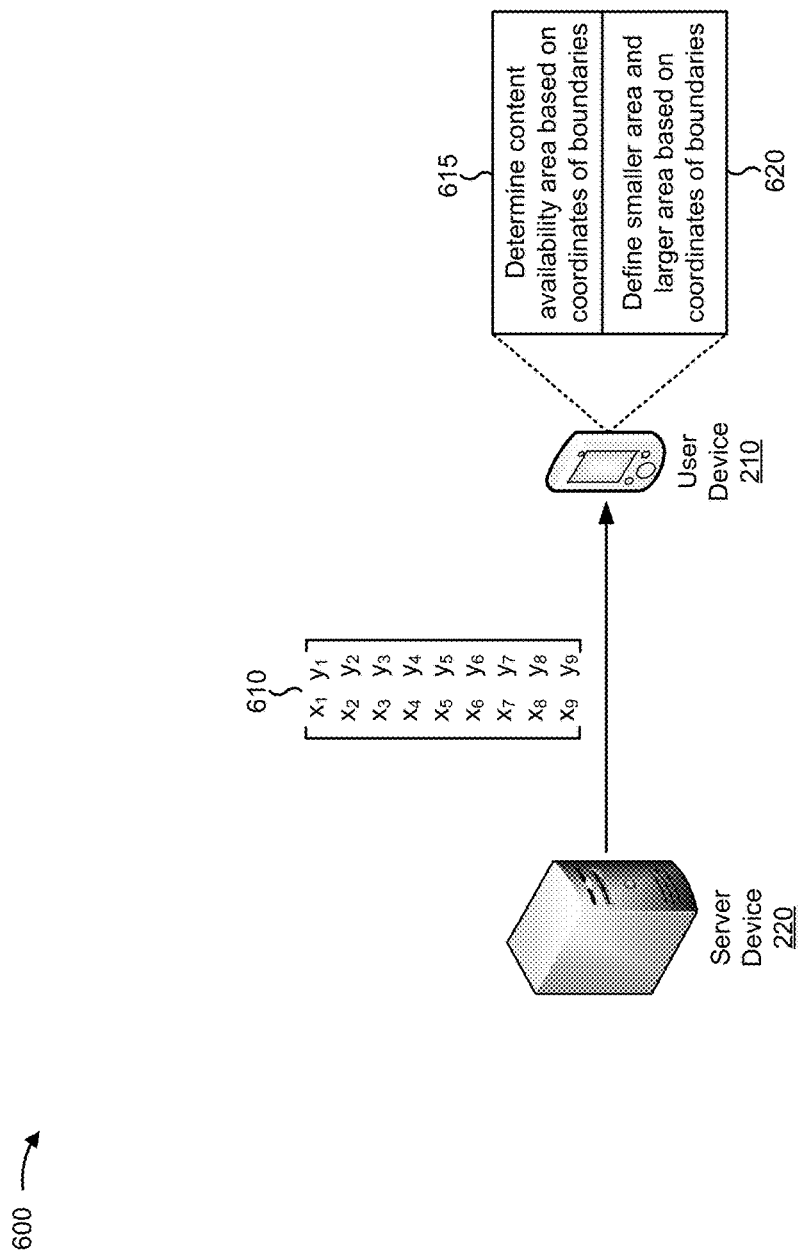

As shown in FIG. 6B, and by reference number 610, server device 220 may provide the boundary information to user device 210. Assume that user device 210 receives the boundary information. As shown by reference number 615, user device 210 may determine the content availability area based on the coordinates of the boundaries. As shown by reference number 620, user device 210 may define a smaller area and a larger area based on the coordinates of the boundaries.

Figure 6C:
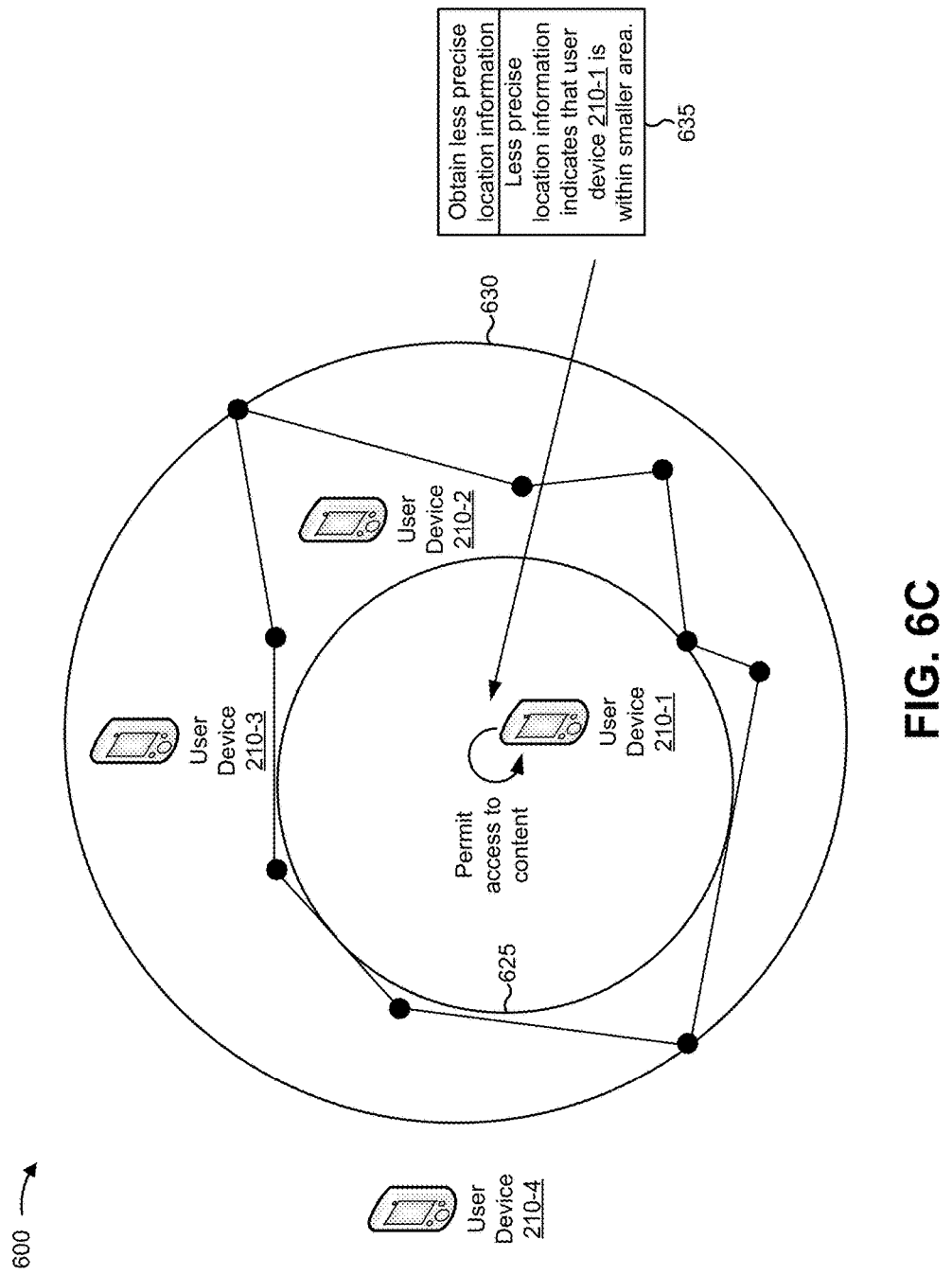

As shown in FIG. 6C, and by reference number 625, the smaller area may be circular in shape. Assume that the smaller area is inscribed in the boundaries of the content availability area. As shown by reference number 630, the larger area may be circular in shape. Assume that the larger area circumscribes the boundaries of the content availability area. As shown by reference number 635, user device 210-1 obtains location information with a first level of specificity. Assume that user device 210-1 obtains the location information with the first level of specificity from a passive location system without consuming battery power by activating an active location system. As shown, user device 210-1 determines that user device 210-1 is located inside of the smaller area based on the location information with the first level of specificity. As further shown, based on being located inside of the smaller area, and therefore inside of the content availability area, user device 210-1 permits access to the content. In this way, user device 210-1 may conserve battery power by determining to permit access to content based on location information with the first level of specificity, in a situation when more specific location information from an active location system is unnecessary.

Figure 6D:
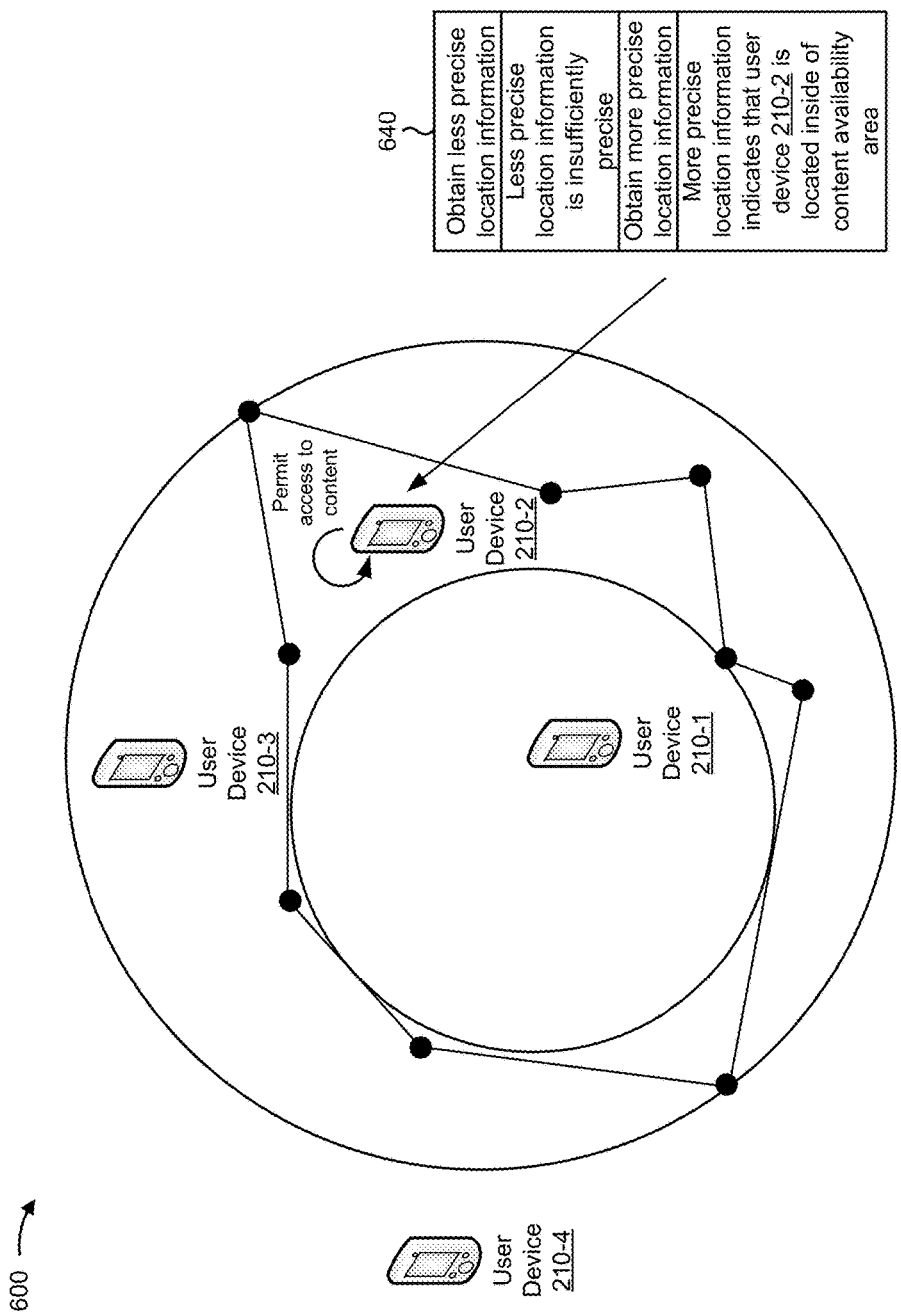

As shown in FIG. 6D, and by reference number 640, user device 210-2 obtains location information with a first level of specificity. As further shown, user device 210-2 determines that the location information with the first level of specificity is insufficiently precise to determine whether user device 210-2 is located inside of the content availability area. Assume that user device 210-2 determines that the location information with the first level of specificity is insufficiently precise based on the location information with the first level of specificity indicating that user device 210-2 is located inside of the larger area and outside of the smaller area. As further shown, user device 210-2 obtains location information with a second level of specificity (e.g., that is more precise than the location information with the first level of specificity). Assume that user device 210-2 obtains the location information with the second level of specificity by activating an active location system (e.g., a GPS component) of user device 210-2, which may consume additional processor power and/or battery power, and may provide the location information with the second level of specificity. As shown, user device 210-2 determines that user device 210-2 is located inside of the content availability area based on the location information with the second level of specificity, and permits access to the content accordingly.

Figure 6E:
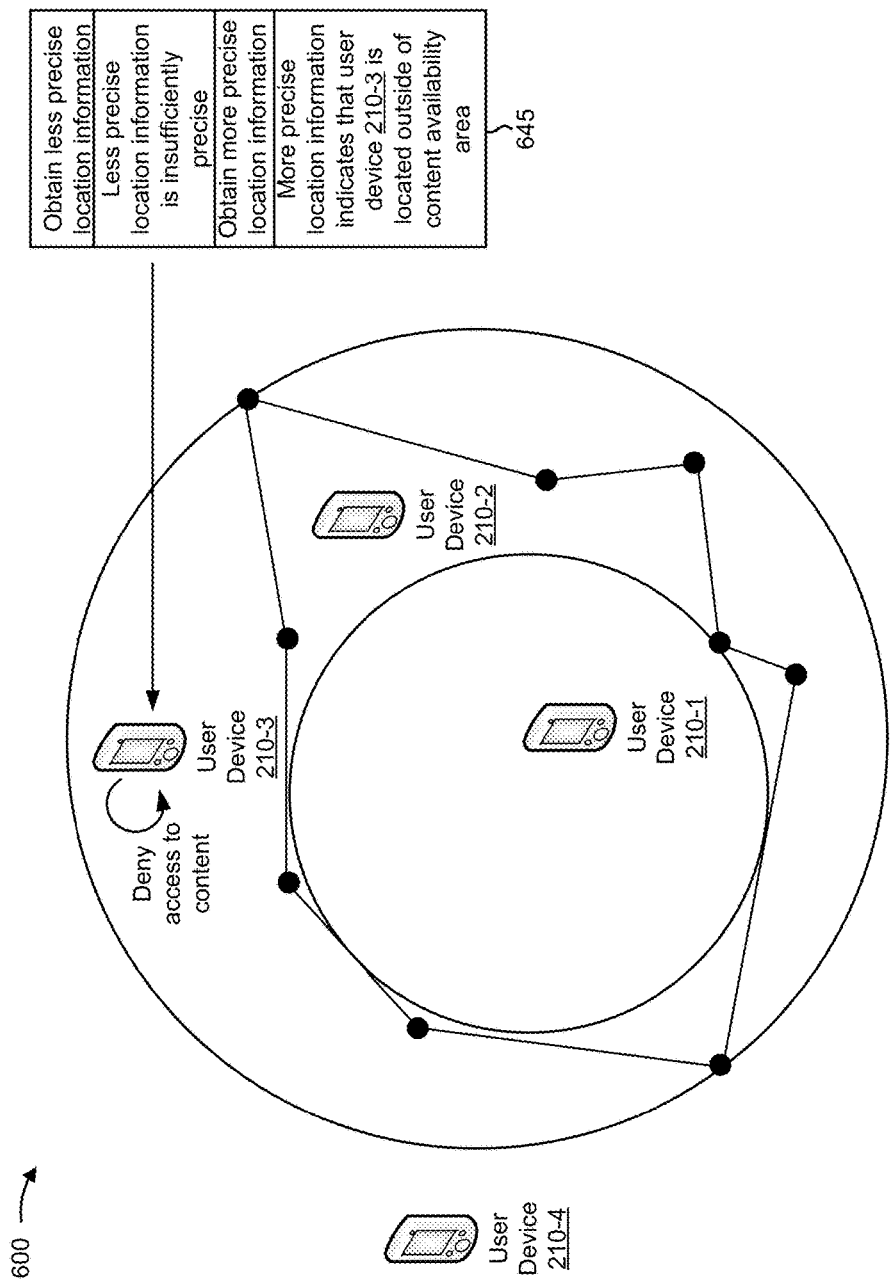

As shown in FIG. 6E, and by reference number 645, user device 210-3 obtains location information with a first level of specificity. As further shown, user device 210-3 determines that the location information with the first level of specificity is insufficiently precise to determine whether user device 210-3 is located inside of the content availability area. Assume that user device 210-3 determines that the location information with the first level of specificity is insufficiently precise based on the location information indicating that user device 210-3 is located inside of the larger area and outside of the smaller area. As further shown, user device 210-3 obtains location information with a second level of specificity (e.g., that is more precise than the location information with the first level of specificity). Assume that user device 210-3 obtains the location information with the second level of specificity by activating an active location system (e.g., a GPS component) of user device 210-3, which may consume additional processor power and/or battery power, and may provide the location information. As shown, user device 210-3 determines that user device 210-3 is located outside of the content availability area based on the location information with the second level of specificity, and denies access to the content accordingly.

Figure 6F:
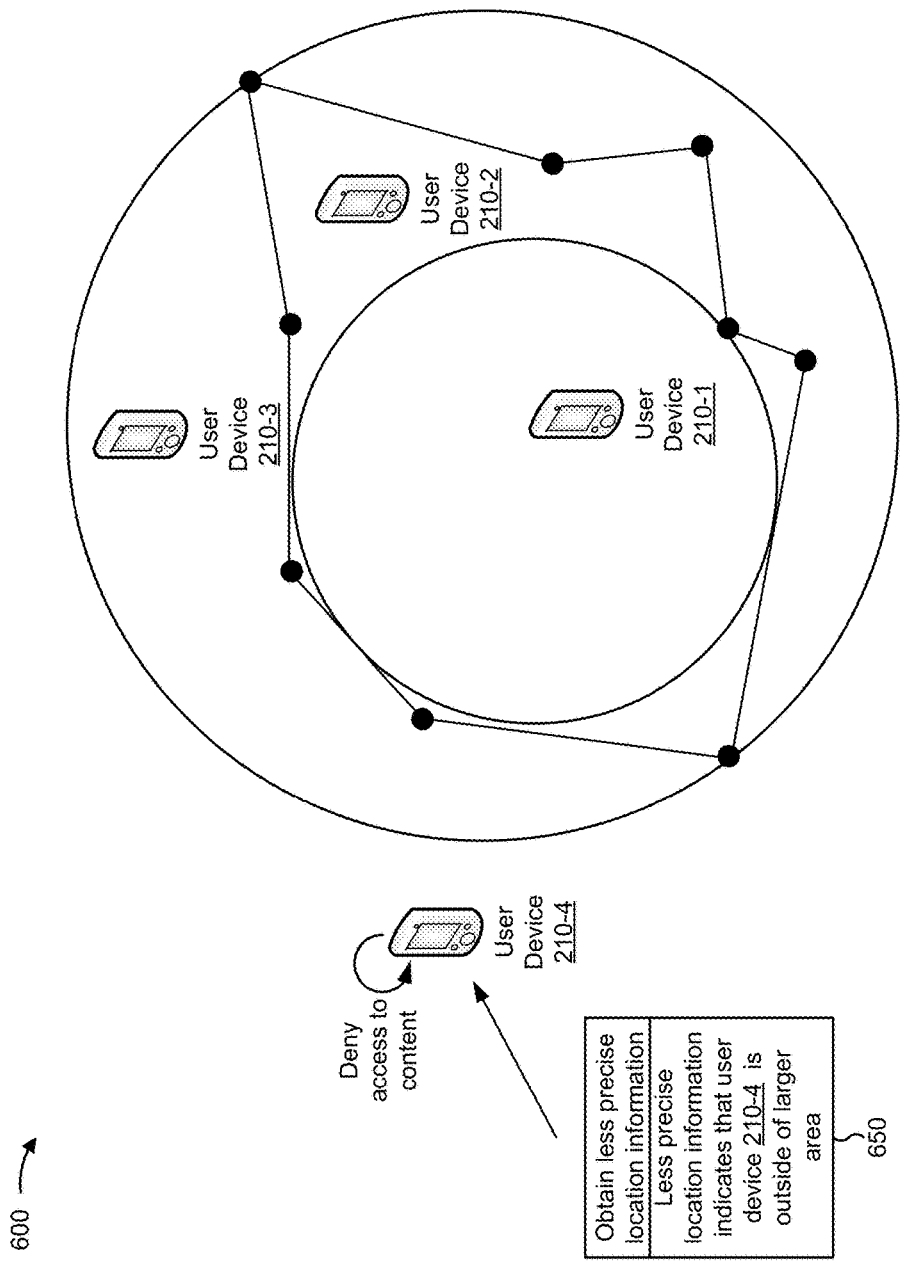

As shown in FIG. 6F, and by reference number 650, user device 210-4 obtains location information with a first level of specificity. Assume that user device 210-4 obtains the location information with the first level of specificity from a passive location system, without consuming battery power by activating an active location system. As shown, user device 210-4 determines that user device 210-4 is located outside of the larger area based on the location information with the first level of specificity. As further shown, based on being located outside of the larger area, and therefore outside of the content availability area, user device 210-4 denies access to the content. In this way, user device 210-4 may conserve battery power by determining to deny access to content based on location information with the first level of specificity, in a situation when more precise location information from an active location system is unnecessary.

As indicated above, FIGS. 6A-6F are provided merely as an example. Other examples are possible and may differ from what was described with regard to FIGS. 6A-6F.

In this way, a user device may use a passive location system to determine that the user device is located inside of a smaller area that is included in an irregularly shaped content availability area, or that the user device is located outside of a larger area that includes the content availability area. In such cases, the user device may conserve battery power by determining that the user device is located inside of or outside of the content availability area without activating an active location system. In situations where the passive location system is insufficiently precise to determine whether the user device is located inside of the content availability area, the user device may activate an active location system, which may consume additional battery power, and which may provide location information of a precision sufficient to determine whether the user device is located within the content availability area.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive a request for content,
the content being associated with a content availability area,
user devices located inside of the content availability area being permitted access to the content, and
user devices located outside of the content availability area being denied access to the content;

determine a first area entirely contained within the content availability area;
determine a second area that entirely contains the content availability area;
obtain first location information that identifies a location of a user device,
the first location information obtained using a first location system; and
obtain second location information when the first location information identifies the location of the user device as outside of the first area and inside of the second area,
the second location information obtained using a second location system, different from the first location system,
the second location information being more precise, with respect to the location of the user device, than the first location information, and
the second location information being used to determine whether the user device is located within the content availability area.

2. The device of claim 1, where the one or more processors, when obtaining the second location information, are to:
obtain the second location information from the user device.

3. The device of claim 1, where the one or more processors are further to:
selectively permit or deny access to the content based on the second location information,
the device permitting access to the content when the second location information identifies the location of the user device as inside of the content availability area, and
the device denying access to the content when the second location information identifies the location of the user device as outside of the content availability area.

4. The device of claim 1, where the first area is circular in shape and the second area is circular in shape.

5. The device of claim 4, where the first area is concentric with the second area.

6. The device of claim 1, where the one or more processors, when obtaining the second location information, are to:
cause the user device to activate the second location system to determine the second location information,
the second location system being a global positioning system.

7. The device of claim 1, where the content availability area comprises a boundary defined by a plurality of coordinates.

8. A computer-readable medium storing instructions, the instructions comprising:
one or more instructions that, when executed by one or more processors, cause the one or more processors to:
receive a request for content,
the content being associated with a content availability area,
user devices located inside of the content availability area being permitted access to the content, and
user devices located outside of the content availability area being denied access to the content;
determine a first area entirely encompassed by the content availability area;
determine a second area that entirely encompasses the content availability area;
obtain first location information that identifies a location of a user device associated with the request for the content,
the first location information obtained using a first location system; and
obtain second location information when the first location information identifies the location of the user device as outside of the first area and inside of the second area,
the second location information obtained using a second location system, different from the first location system,
the second location information being more precise, with respect to the location of the user device, than the first location information, and
the second location information being used to determine whether the user device is located within the content availability area.

9. The computer-readable medium of claim 8, where the one or more instructions, when executed by the one or more processors, further cause the one or more processors to:
selectively permit or deny access to the content based on the second location information,
the user device being permitted access to the content when the user device is located inside of the content availability area, and
the user device being denied access to the content when the user device is located outside of the content availability area.

10. The computer-readable medium of claim 8, where the one or more instructions, that cause the one or more processors to obtain the second location information, cause the one or more processors to:
obtain the second location information from the user device.

11. The computer-readable medium of claim 10, where the one or more instructions, that cause the one or more processors to obtain the second location information from the user device, cause the one or more processors to:
cause the user device to activate the second location system to determine the second location information,
the second location system being a global positioning system.

12. The computer-readable medium of claim 8, where the one or more instructions, that cause the one or more processors to obtain the first location information, cause the one or more processors to:
obtain the first location information based on at least one of:
a communication by the user device with one or more base stations,
a communication by the user device with one or more wireless access points,
a communication by the user device with one or more other user devices, or
previously determined location information.

13. The computer-readable medium of claim 8, where the first area is inscribed in the content availability area; and
where the second area circumscribes the content availability area.

14. The computer-readable medium of claim 8, where the content availability area comprises a boundary defined by a plurality of coordinates.

15. A method, comprising:
receiving, by a device, a request for content,
the content being associated with a content availability area, user devices located inside of the content availability area being permitted access to the content, and user devices located outside of the content availability area being denied access to the content;

determining, by the device, a first area entirely encompassed by the content availability area;

determining, by the device, a second area that entirely encompasses the content availability area;

obtaining, by the device, first location information that identifies a location of a user device associated with the request for the content, the first location information obtained using a first location system; and obtaining, by the device, second location information when the first location information identifies the location of the user device as outside of the first area and inside of the second area, the second location information obtained using a second location system, different from the first location system, the second location information being more precise, with respect to the location of the user device, than the first location information, and the second location information being used to determine whether the user device is located within the content availability area.

16. The method of claim 15, further comprising:

selectively permitting or denying access to the content based on the second location information, the user device being permitted access to the content when the user device is located inside of the content availability area, and the user device being denied access to the content when the user device is located outside of the content availability area.

17. The method of claim 15, where the second location system is a global positioning system.

18. The method of claim 15, where the first area is regularly-shaped; and where the second area is regularly-shaped.

19. The method of claim 15, where the content availability area comprises a boundary defined by a plurality of coordinates.

20. The method of claim 15, where obtaining the first location information comprises:

obtaining the first location information based on at least one of:

a communication by the user device with one or more base stations, a communication by the user device with one or more wireless access points, a communication by the user device with one or more other user devices, or previously determined location information.

* * * * *